US012298796B2

(12) United States Patent
Buono

(10) Patent No.: US 12,298,796 B2
(45) Date of Patent: *May 13, 2025

(54) ACCELERATED TRANSIENT RESPONSE OPERATIONAL AMPLIFIER CIRCUIT

(71) Applicant: Crestron Electronics, Inc., Rockleigh, NJ (US)

(72) Inventor: Robert Buono, Mahwah, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,906

(22) Filed: Jan. 3, 2024

(65) Prior Publication Data

US 2024/0134403 A1 Apr. 25, 2024

Related U.S. Application Data

(63) Continuation of application No. 17/507,967, filed on Oct. 22, 2021, now Pat. No. 11,899,481.

(60) Provisional application No. 63/105,298, filed on Oct. 25, 2020.

(51) Int. Cl.
*G05F 1/575* (2006.01)

(52) U.S. Cl.
CPC .................................... *G05F 1/575* (2013.01)

(58) Field of Classification Search
CPC .......... G05F 1/575; G05F 1/565; G05F 1/567; G05F 1/569; G05F 1/571; G05F 1/573; G05F 1/5735; G05F 1/585; G05F 1/59
See application file for complete search history.

(56) References Cited

U.S. PATENT DOCUMENTS

| | | | | |
|---|---|---|---|---|
| 2009/0174383 A1* | 7/2009 | Tsui | H02M 3/156 | |
| | | | 323/282 | |
| 2015/0061628 A1* | 3/2015 | Nguyen | H03K 5/135 | |
| | | | 323/282 | |
| 2020/0228010 A1* | 7/2020 | Wiktor | H02M 3/157 | |

* cited by examiner

*Primary Examiner* — Nguyen Tran
(74) *Attorney, Agent, or Firm* — Mark W. Hrozenchik

(57) ABSTRACT

A feedback control circuit is described herein, comprising: an operational amplifier (op-amp) integrated circuit, wherein a first output of the op-amp provides a feedback error control signal; at least two transistors provided in a feedback path between the first output of the op-amp and an inverting input to the op-amp; and a plurality of discrete electrical components in the feedback path, such that in response to either an increase or decrease of an inverting input voltage at the inverting input that exceeds a predetermined level, at least one of the at least two transistors is turned on, and the feedback control circuit provides the feedback error control signal with an increased slew rate.

17 Claims, 2 Drawing Sheets

ACCELERATED TRANSIENT RESPONSE OPERATIONAL AMPLIFIER CIRCUIT

The present application claims priority under 35 U.S.C. § 120 as a continuation patent application to U.S. Non-provisional patent application Ser. No. 17/507,967, filed on Oct. 22, 2021 (now U.S. Pat. No. 11,899,481 issued on Feb. 13, 2024) and to U.S. Provisional Patent Application Ser. No. 63/105,298, filed Oct. 25, 2020, the entire contents of both of which are expressly incorporated herein by reference.

BACKGROUND OF THE INVENTION

Technical Field

The embodiments described herein relate generally to power factor correction circuits that utilize operational amplifiers (Op Amps) in feedback control loops, and more particularly to systems, methods, and modes for an Op Amp circuit that provides improved response to transients in both load shedding as well as load increasing without any degradation in power factor performance or direct current (DC) regulation precision and accuracy.

Background Art

Applications such as power factor correction (PFC) circuits, utilize Op Amps in feedback control loops. These control loops typically maintain DC output voltage, while simultaneously achieving high (i.e., close to unity) power factor. One of the keys to achieving high power factor performance is to roll-off the gain of the feedback loop below the frequency of the rectified line. For example, for a nominal 60 Hz mains frequency, the rectified line frequency will be 120 Hz. It is important that the voltage feedback loop does not modulate the input current (from the mains) over the 8.33 msec rectified line interval. Doing so will degrade the power factor. Simply rolling-off the gain of the voltage feedback Op Amp at low frequency is simple, but what complicates this requirement are two additional constraints. The first is that the voltage gain at DC should be as high as possible to provide excellent DC output voltage regulation. Second, the feedback loop should not be so excessively slow, that perturbations in the line input voltage or line or load current (line and load regulation respectively) take too long for the feedback loop to correct, or result in too high transient excursions of the output voltage. Those of skill in the art can appreciate that these constraints are in opposition. The feedback loop needs to be slow, with gain rolled off sufficiently, below 120 Hz, yet fast enough to limit output voltage errors resulting from line or load transients.

Known attempts to solve these problems focused on either improving responses to increasing load current, or to improving responses to decreasing load current. For example, one prior art approach included special measures in order to improve the feedback loop response to line and load transients. Particularly, an additional pullup current source is added to the output of the voltage control Op Amp to speed up its response. As those of skill in the art can appreciate, however, this will only speed up the response in one direction. That is, speeding up the response to a voltage dip caused by increasing output load current. Nothing is done in regard to Op Amp response to load shedding. The voltage loop will be equally slow in responding to decreasing load current as it is to increasing load current, and no special compensatory measures have been provided in the prior art in regard to load shedding response.

Accordingly, a need has arisen for systems, methods, and modes for an Op Amp circuit that provides improved response to transients in both load shedding as well as load increasing without any degradation in power factor performance or DC regulation precision and accuracy.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for an Op Amp circuit that provides improved response to transients in both load shedding as well as load increasing without any degradation in power factor performance or DC regulation precision and accuracy that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a feedback control circuit is provided, comprising: an operational amplifier (op-amp) integrated circuit, wherein a first output of the op-amp provides a feedback error control signal; at least two transistors provided in a feedback path between the first output of the op-amp and an inverting input to the op-amp; and a plurality of discrete electrical components in the feedback path, such that in response to either an increase or decrease of an inverting input voltage at the inverting input that exceeds a predetermined level, at least one of the at least two transistors is turned on, and the feedback control circuit provides the feedback error control signal with an increased slew rate.

According to the first aspect of the embodiments, the increase or decrease of an inverting input voltage at the inverting input exceeds a predetermined level, feedback current flows through a feedback resistor wired in parallel to respective base-emitter junctions of the at least two transistors to generate a voltage across the resistor and base-emitter junctions and at least one of the at least two transistors is turned on, depending on a direction of the feedback current.

According to the first aspect of the embodiments, the slew rate of the feedback error control signal increases by a factor of about 300.

According to the first aspect of the embodiments, the at least two transistors provided in the feedback path comprises: an NPN transistor comprising a first emitter, a first base, and a first collector, wherein the first collector is connected to a first power supply voltage, the first emitter is connected to a first end of a feedback resistor, and the first base is connected to a second end of the feedback resistor and the inverting input of the op-amp; and a PNP transistor comprising a second emitter, a second base and a second collector, wherein the second emitter is connected to the first end of the feedback resistor, the second collector is connected to ground, and the second base is connected to the second end of the feedback resistor and the first base and the inverting input of the op-amp.

According to the first aspect of the embodiments, the feedback control circuit further comprises: a capacitor with a first end and a second end, wherein the first end of the capacitor is connected to the first output of the op-amp, and the second end of the capacitor is connected to the first and second emitters and the first end of the feedback resistor; and a reference voltage is provided to a non-inverting input of the op-amp.

According to the first aspect of the embodiments, the inverting input voltage is generated by providing a resistor voltage divider network connected between a main voltage and ground, and wherein the main voltage is a voltage to be monitored and controlled by the feedback control circuit.

According to the first aspect of the embodiments, a power factor control circuit is provided comprising the feedback control circuit described above, and wherein the feedback error control signal controls a main voltage of the power factor control circuit.

According to the first aspect of the embodiments, the feedback error control signal is connected to other circuitry through a galvanic isolation barrier.

According to the first aspect of the embodiments, the galvanic isolation barrier comprises: an optoelectronic device.

According to a second aspect of the embodiments, a power factor control circuit is provided, comprising: a modulator and power stage adapted to provide a main voltage; and a feedback control circuit, comprising: an operational amplifier (op-amp) integrated circuit, wherein a first output of the op-amp provides a feedback error control signal; at least two transistors provided in a feedback path between the first output of the op-amp and an inverting input to the op-amp; and a plurality of discrete electrical components in the feedback path, such that in response to either an increase or decrease of an inverting input voltage at the inverting input that exceeds a predetermined level, at least one of the at least two transistors is turned on, and the feedback control circuit provides the feedback error control signal with an increased slew rate.

According to the second aspect of the embodiments, when the increase or decrease of an inverting input voltage at the inverting input exceeds a predetermined level, feedback current flows through a feedback resistor wired in parallel to respective base-emitter junctions of the at least two transistors to generate a voltage across the resistor and base-emitter junctions and at least one of the at least two transistors is turned on, depending on a direction of the feedback current.

According to the second aspect of the embodiments, the slew rate of the feedback error control signal increases by a factor of about 300.

According to the second aspect of the embodiments, the at least two transistors provided in the feedback path comprises: an NPN transistor comprising a first emitter, a first base, and a first collector, wherein the first collector is connected to a first power supply voltage, the first emitter is connected to a first end of a feedback resistor, and the first base is connected to a second end of the feedback resistor and the inverting input of the op-amp; and a PNP transistor comprising a second emitter, a second base and a second collector, wherein the second emitter is connected to the first end of the feedback resistor, the second collector is connected to ground, and the second base is connected to the second end of the feedback resistor and the first base and the inverting input of the op-amp.

According to the second aspect of the embodiments, the power factor control circuit further comprises: a capacitor with a first end and a second end, wherein the first end of the capacitor is connected to the first output of the op-amp, and the second end of the capacitor is connected to the first and second emitters and the first end of the feedback resistor; and a reference voltage is provided to a non-inverting input of the op-amp.

According to the second aspect of the embodiments, the inverting input voltage is generated by providing a resistor voltage divider network connected between the main voltage and ground, and wherein the main voltage is a voltage to be monitored and controlled by the feedback control circuit.

According to the second aspect of the embodiments, the feedback error control signal is connected to other circuitry through a galvanic isolation barrier.

According to the second aspect of the embodiments, the galvanic isolation barrier comprises: an optoelectronic device.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

DETAILED DESCRIPTION

Figure 1:
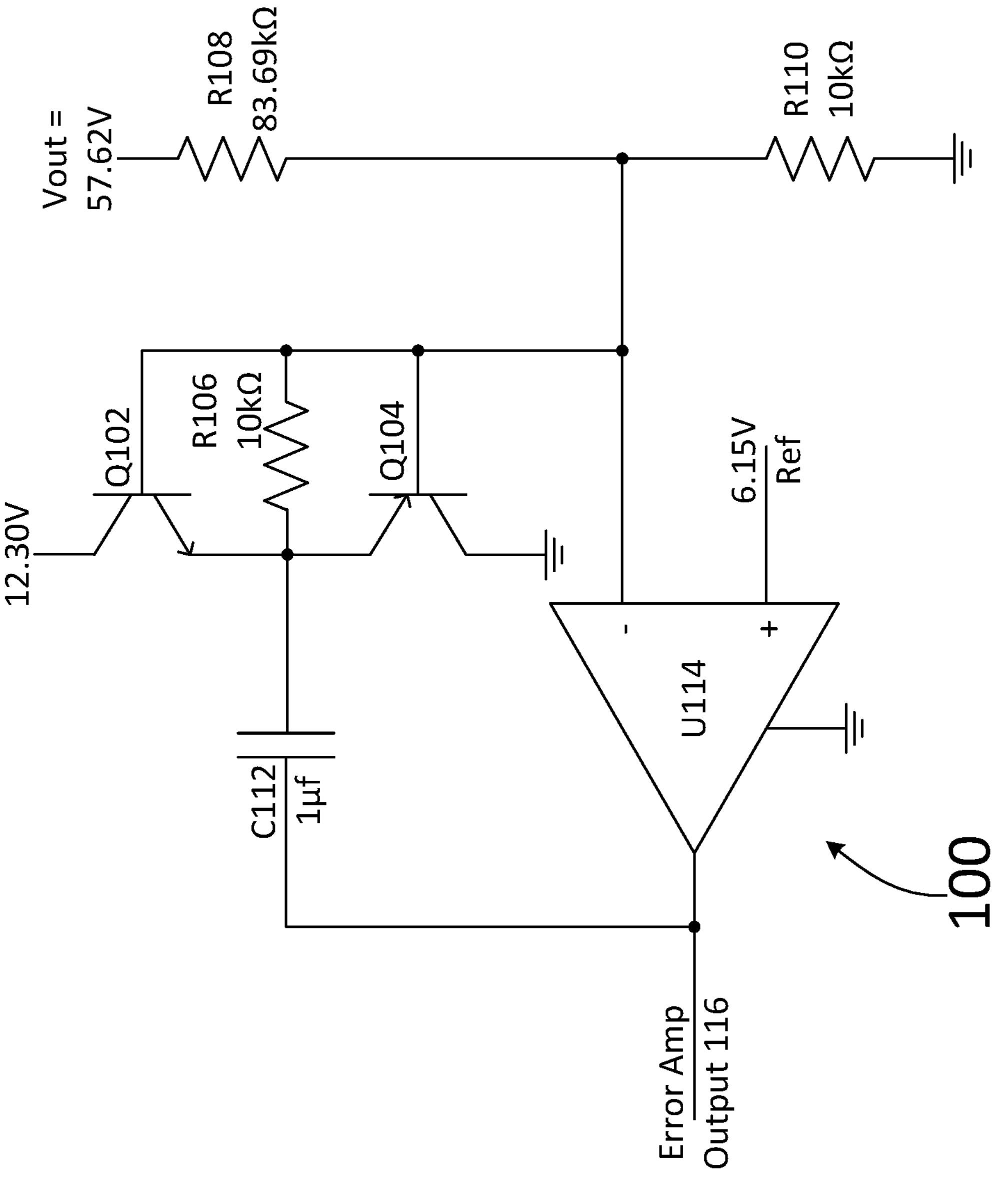
FIG. 1 illustrates a representative schematic diagram of a circuit that includes two transistors in the feedback loop of an Op Amp that provides improved response to transients in both directions (load shedding as well as load increasing) according to aspects of the embodiments.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as audio amplifiers, but can be used in virtually any type of power supply.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of a systems, methods, and modes for an Op Amp circuit that provides improved response to transients in both load shedding as well as load increasing without any degradation in power factor performance or DC regulation precision and accuracy, but is not limited thereto, except as may be set forth expressly in the appended claims.

For 40 years Crestron Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes for an Op Amp circuit that provides improved response to transients in both load shedding as well as load increasing without any degradation in power factor performance or DC regulation precision and accuracy are applicable to usage in audio/video distribution systems that can be manufactured by Crestron Electronics Inc., located in Rockleigh, NJ. Such devices can include audio amplifiers such as the DM-NAX-8ZSA.

FIG. 1 illustrates a representative schematic diagram of Op Amp circuit 100 that includes two transistors in the feedback loop of an Op Amp that provides improved response to transients in both directions (load shedding as well as load increasing) according to aspects of the embodiments.

Aspects of the embodiments are directed to Op Amp circuit 100 that provides improved response to transients in both directions (load shedding as well as load increasing). The enhanced transient response is provided without any degradation in power factor performance or DC regulation precision and accuracy. According to aspects of the embodiments, and as shown in FIG. 1, an NPN and PNP transistor are located across the ac-coupled feedback resistor within Op Amp circuit 100 to achieve the bi-directional improved response to transients (load shedding as well as load increasing).

Attention is directed to FIG. 1 and Op Amp circuit 100. It can be appreciated by those skilled in the art that if the NPN and PNP transistors in FIG. 1 were removed (Q102, Q104, respectively), the circuit would consist of Op Amp U114 with a series connected resistor (R106)-capacitor (C112) network as the feedback network. This network would allow Op Amp U114 to have extremely high DC gain. The capacitive reactance of capacitor C112 would result in a gain decrease with frequency until a frequency zero were reached at F=1/(2piRC), at which point the gain roll-off would stop and the gain would remain stable as frequency increased. For the values shown in FIG. 1, the frequency zero occurs at about 15.9 Hz, above which the gain stabilizes at about −10K/83.69K=−0.119x=−18.45 dB. The response at the output node of Op Amp U114 to transients can best be described in the time domain, by describing the change in voltage (dv/dt) across the 1 uF feedback capacitor C112, in which the current through capacitor C112, ($I_c$) equals the capacitance (in Farads) times the rate of change of voltage with respect to time, or Cx(dv/dt). Because the inverting input to Op Amp U114 is a virtual null node, and the non-inverting input is fixed at the 6.15V reference voltage, Op Amp U114 can operate so as to maintain the voltage at the inverting input equal to the voltage at the noninverting input.

Further, since the voltage across 10K resistor R110 connected from the inverting input of U114 to ground is maintained constant, and therefore the current through the same 10K resistor R110 is also maintained at a constant value, transient voltage and current changes will only occur across the R-C feedback network components (R106, C112) and the 83.69 Kohm output sensing resistor R108.

An example of voltage transient response will now be described. Initially, it is presumed that the NPN transistor Q102 and PNP transistor Q104 have not been added to the circuit. In the steady-state, with both inverting and non-inverting Op Amp U114 inputs maintained at 6.15V, and no current flowing in the feedback network, due to the DC blocking effect of the 1 uF capacitor C112, the regulated output voltage of the Power Factor Corrector (PFC) (at the top of the 83.69K resistor R108) will be 57.62V, and 615 uA will flow through the 83.69 Kohm resistor R108. If a load transient results in a 5V dip in $V_{out}$ (e.g., falling to 52.62 from 57.62V), the current through the 83.69 Kohm resistor R108 will drop from 615 uA to 555.26 uA, which is a shortfall of about 59.74 uA. In this case, the output pin of Op Amp U114 will respond in such a manner so as to maintain the inverting pin at 6.15V. This involves generating a current through the feedback network (C112, R106) of 59.74 uA, to make up for the shortfall in current being supplied through the 83.69 Kohm resistor R108. Now in order to generate a current of 59.74 uA through the feedback network (C112, R106), there needs to be a rate of change of voltage over time (dv/dt) created across the 1 uF feedback capacitor C112 of about 59.74V/sec. If the output of Op Amp U114 drives a pulse width modulator (PWM), and further, if the full output voltage range of Op Amp U114 is used to affect a 0 to 100% duty cycle change in the modulator, the output of Op Amp U114 would need to swing as much as 10V in order to fully control the modulation range of the modulator. Since the output of Op Amp U114 is constrained to swing at a dv/dt of 59.74V/sec, it will take 167.4 msec for the output voltage of Op Amp U114 to slew 10V. Those of skill in the art can appreciate that this is an extremely slow response.

According to aspects of the embodiments, the addition of the NPN transistor Q102 and the PNP transistor Q104 to Op Amp U114 greatly increases the transient response and slew rate of Op Amp U104. Using the same example described above, and assuming a $V_{BE-ON}$ of about 0.6V for both transistors Q102, Q104, these will both be off as long as the voltage across the 10K feedback resistor R106 is less than about 0.6V. This corresponds directly to a current of about 60 uA, and to an output voltage droop of about 5.02V (60 uA×83.69K ohm). Thus, for output transients of less than about +/−5V, the added transistors Q102, Q104 will be OFF, and will have no effect on circuit operation, and therefore will not degrade steady state power factor. Also, since both transistors Q102, Q104 are off, their base currents will be essentially about GA and they will not affect the DC operating point of Op Amp U114, or the regulated precision of the DC output of the power factor corrector.

However, once an output transient voltage change exceeds 5V, one or the other transistor Q102, Q104 will turn on, depending on whether the transient is an output voltage dip or a voltage surge. For the sake of clarity, our discussion will continue with a voltage dip. If the voltage drop across the feedback resistor R106 just exceeds about 0.6V, then the PNP transistor Q104 will turn on, and the voltage across the 10K resistor R106 will be clamped at about 0.6V by the $V_{BE}$ of the PNP transistor Q104. This essentially limits the current that the feedback network (C112, R106) can supply to the inverting node of Op Amp U114 to just about 60 uA.

According to aspects of the embodiments, if the voltage at the inverting pin of U114 continues to fall, the output of Op Amp U114 will attempt to slew positive to correct the voltage error. The positive slewing of the output of Op Amp U114 will have little effect on the voltage at the inverting node because the current is limited to about 60 uA by the PNP transistor Q104. However, any current in excess of about 60 uA will be shunted by the PNP transistor Q104 to ground. Any current in excess of about 60 μA provided by the output of Op Amp U114 serves to greatly increase dv/dt across the feedback capacitor C112, allowing it to charge very quickly, and therefore allowing the output pin of Op Amp U114 to slew very quickly, to rapidly change the pulse width modulation setting, to quickly correct the output voltage error.

By way of a non-limiting example, suppose the output current of Op Amp U114, error amp output 116, is limited (internally) to about +/−20 mA (a typical value). This 20 mA is then available to charge the 1 uF capacitor C112 and is shunted to ground by the PNP transistor Q104. This allows the output voltage of Op Amp U114 to slew at a rate of 20,000V/sec. Therefore, it will take only 0.5 msec for the output pin of Op Amp U114 to slew to the full 10V required to control the full pulse width modulation range (10 v/20,000 v/sec=0.5 msec). Circuit 100 operates substantially identically when slewing in the opposite direction, to correct an output voltage surge, employing the NPN transistor Q102 and shunting capacitor C112 charging current to the 12.3V rail instead of to ground. This results in an improvement in response time to a voltage excursion of about 33,378% ((20,000−59.74)/59.74×100%).

Figure 2:
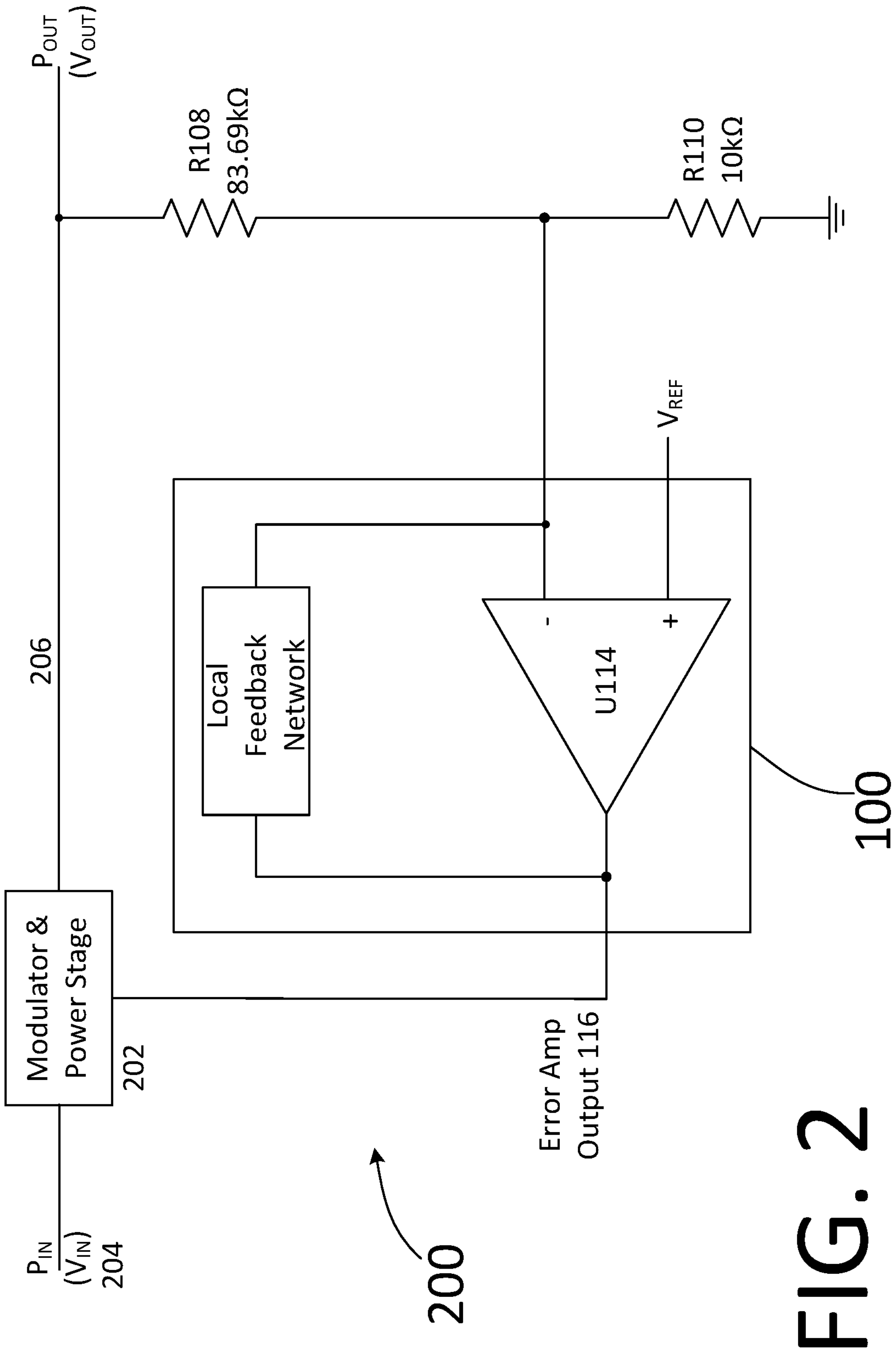
FIG. 2 illustrates a high level block diagram of a generic feedback network in which the Op Amp circuit of FIG. 1 can be used with the local feedback network as shown in FIG. 1 according to aspects of the embodiments.

FIG. 2 illustrates a very high level block diagram of generic feedback network 200 in which Op Amp circuit 100 of FIG. 1 can be used with a local feedback network as shown in FIG. 1 according to aspects of the embodiments. Such generic feedback network 200 can be used in substantially any type of power supply. According to further aspects of the embodiments, Op Amp circuit 100 can also be advantageously used in power factor correction (PFC) circuits, because PFCs typically require intentionally low bandwidth (slow response), in order to function. As described herein above, this slow response naturally leads to a voltage overshoot during load shedding and a voltage dip or undershoot during load increasing, and according to aspects of the embodiments, and as described above, Op Amp circuit 100 substantially reduces the amount of, and duration of, both a voltage dip and overshoot.

As those of skill in the art can appreciate, most PFC circuits reside entirely on the primary side (line side) of the safety isolation barrier in off-line AC/DC power supplies. In these cases, the output of the error-amplifier op-amp (e.g., error amp output 116) can directly drive the control input of a PFC control integrated circuit (IC), and no intervening circuitry would be required. If, however, the op-amp (e.g., U114) were powered from different power supply rails than the PFC control IC, then some voltage level shifting might be required. Typical off-line AC/DC supplies that use PFC have 2 distinct stages. There is a standalone PFC stage, residing totally on the primary side of the isolation barrier, followed by an isolated DC/DC stage, which takes the high voltage generated by the PFC stage, and converts it to an isolated DC output, across a safety isolation barrier (through a transformer).

According to aspects of the embodiment, the PFC circuit as shown in FIG. 2 (modulator and power stage 202) is configured differently that those circuits described above. The circuit shown in FIG. 2 (and related circuitry not shown) uses a single power conversion stage in order to operate at higher efficiency, because each time power is processed through a power conversion stage there are losses. Thus, in the power supply used for the circuitry of FIG. 2, PFC, DCDC conversion and isolation all occur in a single power conversion stage. This means that Op-Amp U114 resides on the secondary (DC output side) of the isolation barrier, and the PFC control IC resides on the primary side of the isolation barrier. So, in order for Op-Amp U114 to communicate with the PFC control IC, its output signal (error amp output 116) uses an optocoupler to span the isolation barrier.

According to further aspects of the embodiments, the embodiments described herein can be used anywhere that a normally slow, precise response is needed for nominal conditions, but a very fast response is needed for "out-of-bound" conditions. One non-limiting example are overcurrent or overvoltage protection circuits. For example, one can easily imagine that it could be advantageous to allow a slow protection response to a small to moderate overcurrent event, yet if the overcurrent level reached a certain threshold, where component damage could occur, a very fast protection response would be desired. The same would be true for an overvoltage protection response and an overtemperature protection response, where you would want two different response speeds depending on the magnitude of the "out-of-bounds" condition.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The disclosed embodiments provide systems, methods, and modes for an Op Amp circuit that provides improved response to transients in both load shedding as well as load increasing without any degradation in power factor performance or DC regulation precision and accuracy.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

INDUSTRIAL APPLICABILITY

To solve the aforementioned problems, the aspects of the embodiments are directed towards systems, methods, and modes for an Op Amp circuit that provides improved response to transients in both load shedding as well as load increasing without any degradation in power factor performance or DC regulation precision and accuracy.

ALTERNATE EMBODIMENTS

Alternate embodiments may be devised without departing from the spirit or the scope of the different aspects of the embodiments.

What is claimed is:

1. A feedback control circuit, comprising:
- an operational amplifier (op-amp) integrated circuit, wherein a first output of the op-amp provides a feedback error control signal;
- at least two transistors provided in a feedback path between the first output of the op-amp and an inverting input to the op-amp; and
- a plurality of discrete electrical components in the feedback path, such that
  - in response to either an increase or decrease of an inverting input voltage at the inverting input that exceeds a predetermined level, at least one of the at least two transistors is turned on, and the feedback control circuit provides the feedback error control signal with an increased slew rate.

2. The feedback control circuit according to claim 1, wherein
- when the increase or decrease of an inverting input voltage at the inverting input exceeds a predetermined level, feedback current flows through a feedback resistor wired in parallel to respective base-emitter junctions of the at least two transistors to generate a voltage across the resistor and base-emitter junctions and at least one of the at least two transistors is turned on, depending on a direction of the feedback current.

3. The feedback control circuit according to claim 2, wherein the slew rate of the feedback error control signal increases by a factor of about 300.

4. The feedback control circuit according to claim 1, wherein the at least two transistors provided in the feedback path comprises:
- an NPN transistor comprising a first emitter, a first base, and a first collector, wherein
  - the first collector is connected to a first power supply voltage,
  - the first emitter is connected to a first end of a feedback resistor, and
  - the first base is connected to a second end of the feedback resistor and the inverting input of the op-amp; and
- a PNP transistor comprising a second emitter, a second base and a second collector, wherein
  - the second emitter is connected to the first end of the feedback resistor,
  - the second collector is connected to ground, and
  - the second base is connected to the second end of the feedback resistor and the first base and the inverting input of the op-amp.

5. The feedback control circuit according to claim 4, further comprising:
- a capacitor with a first end and a second end, wherein
  - the first end of the capacitor is connected to the first output of the op-amp, and
  - the second end of the capacitor is connected to the first and second emitters and the first end of the feedback resistor; and
- a reference voltage is provided to a non-inverting input of the op-amp.

6. The feedback control circuit according to claim 1, wherein
- the inverting input voltage is generated by providing a resistor voltage divider network connected between a main voltage and ground, and wherein the main voltage is a voltage to be monitored and controlled by the feedback control circuit.

7. A power factor control circuit comprising the feedback control circuit according to claim 1, and wherein the feedback error control signal controls a main voltage of the power factor control circuit.

8. The power factor control circuit according to claim 7, wherein the feedback error control signal is connected to other circuitry through a galvanic isolation barrier.

9. The power factor control circuit according to claim 8, wherein the galvanic isolation barrier comprises:
- an optoelectronic device.

10. A power factor control circuit comprising:
- a modulator and power stage adapted to provide a main voltage; and
- a feedback control circuit, comprising:
  - an operational amplifier (op-amp) integrated circuit, wherein a first output of the op-amp provides a feedback error control signal;
  - at least two transistors provided in a feedback path between the first output of the op-amp and an inverting input to the op-amp; and
  - a plurality of discrete electrical components in the feedback path, such that
    - in response to either an increase or decrease of an inverting input voltage at the inverting input that exceeds a predetermined level, at least one of the at least two transistors is turned on, and the feedback control circuit provides the feedback error control signal with an increased slew rate.

11. The power factor control circuit according to claim 10, wherein when the increase or decrease of an inverting input voltage at the inverting input exceeds a predetermined level, feedback current flows through a feedback resistor wired in parallel to respective base-emitter junctions of the at least two transistors to generate a voltage across the resistor and base-emitter junctions and at least one of the at least two transistors is turned on, depending on a direction of the feedback current.

12. The power factor control circuit according to claim 11, wherein the slew rate of the feedback error control signal increases by a factor of about 300.

13. The power factor control circuit according to claim 10, wherein the at least two transistors provided in the feedback path comprises:

an NPN transistor comprising a first emitter, a first base, and a first collector, wherein
 the first collector is connected to a first power supply voltage,
 the first emitter is connected to a first end of a feedback resistor, and
 the first base is connected to a second end of the feedback resistor and the inverting input of the op-amp; and a PNP transistor comprising a second emitter, a second base and a second collector, wherein
 the second emitter is connected to the first end of the feedback resistor,
 the second collector is connected to ground, and
 the second base is connected to the second end of the feedback resistor and the first base and the inverting input of the op-amp.

14. The power factor control circuit according to claim 13, further comprising:

a capacitor with a first end and a second end, wherein
 the first end of the capacitor is connected to the first output of the op-amp, and
 the second end of the capacitor is connected to the first and second emitters and the first end of the feedback resistor; and a reference voltage is provided to a non-inverting input of the op-amp.

15. The power factor control circuit according to claim 10, wherein the inverting input voltage is generated by providing a resistor voltage divider network connected between the main voltage and ground, and wherein the main voltage is a voltage to be monitored and controlled by the feedback control circuit.

16. The power factor correction circuit according to claim 10, wherein the feedback error control signal is connected to other circuitry through a galvanic isolation barrier.

17. The power factor correction circuit according to claim 16, wherein the galvanic isolation barrier comprises:

an optoelectronic device.

* * * * *